US012741675B2

(12) United States Patent
Iida et al.

(10) Patent No.: US 12,741,675 B2
(45) Date of Patent: Sep. 22, 2026

(54) PARKING ASSISTANCE APPARATUS AND PARKING ASSISTANCE METHOD

(71) Applicant: Panasonic Automotive Systems Co., Ltd., Kanagawa (JP)

(72) Inventors: Takuma Iida, Kanagawa (JP); Shota Akaura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 63 days.

(21) Appl. No.: 18/887,657

(22) Filed: Sep. 17, 2024

(65) Prior Publication Data

US 2025/0010884 A1 Jan. 9, 2025

Related U.S. Application Data

(63) Continuation of application No. PCT/JP2022/043483, filed on Nov. 25, 2022.

(30) Foreign Application Priority Data

Mar. 25, 2022 (JP) ................................ 2022-049962

(51) Int. Cl.
*B60W 60/00* (2020.01)
*B60W 30/06* (2006.01)

(52) U.S. Cl.
CPC ........ *B60W 60/0011* (2020.02); *B60W 30/06* (2013.01)

(58) Field of Classification Search
CPC .. B60W 60/011; B60W 30/06; B62D 15/0285
See application file for complete search history.

(56) References Cited

U.S. PATENT DOCUMENTS 10,737,691 B2 8/2020 Oppolzer et al.
2019/0039605 A1 2/2019 Iio et al.
2019/0256144 A1* 8/2019 Yamada ............ B62D 15/0285
2024/0067221 A1* 2/2024 Minase ............ B60W 60/0025

FOREIGN PATENT DOCUMENTS

DE 102016013711 A1 * 5/2017 ......... B62D 15/0285
DE 102017115988 A1 * 1/2019 ............ B60W 30/06
EP 3378737 B1 * 7/2021 ......... B62D 15/0285
JP 2001-277969 10/2001

(Continued)

OTHER PUBLICATIONS

Notice of Reasons for Refusal for Japanese App. No. 2022-049962, dated Jul. 15, 2025, with English translation.

(Continued)

*Primary Examiner* — Helal A Algahaim
(74) *Attorney, Agent, or Firm* — Greenblum & Bernstein, P.L.C.

(57) ABSTRACT

A parking assistance apparatus of the present disclosure performs parking assistance for second parking and includes a processor that generates a second parking route based on the first parking route and position information of an obstacle obtained by the teacher traveling, in which the second parking route does not overlap with the obstacle The processor parks a vehicle in a parking space by using the second parking route, and the second parking route is a parking route for the second parking.

20 Claims, 7 Drawing Sheets

(56) References Cited

FOREIGN PATENT DOCUMENTS

| | | | |
|---|---|---|---|
| JP | 2017-138664 | 8/2017 | |
| JP | 7133336 B2 * | 9/2022 | ............. B60K 35/29 |

OTHER PUBLICATIONS

International Search Report issued in International Pat. Appl. No. PCT/JP2022/043483, dated Feb. 14, 2023, along with an English translation thereof.

English language translation of Office Action from Japan Patent Office (JPO) in Japanese Patent Appl. No. 2022-049962, dated Sep. 9, 2025.

* cited by examiner

PARKING ASSISTANCE APPARATUS AND PARKING ASSISTANCE METHOD

TECHNICAL FIELD

The present disclosure relates to a parking assistance apparatus and a parking assistance method.

BACKGROUND ART

Conventionally, a parking assistance apparatus capable of parking a vehicle in a specific parking space based on teacher traveling is known. Such a parking assistance apparatus stores the traveling route of the vehicle when the vehicle is parked by the driving of a driver in the parking space as a teacher route and automatically parks the vehicle in the parking space based on this teacher route.

For example, Patent Literature (hereinafter, referred to as PTL) 1 discloses a technology for generating a more suitable route based on a teacher route acquired by the driving of the driver.

CITATION LIST

Patent Literature

PTL 1
U.S. Pat. No. 10,737,691

SUMMARY OF INVENTION

Solution to Problem

A parking assistance apparatus according to the present disclosure is a parking assistance apparatus that performs parking assistance for second parking based on a first parking route obtained by teacher traveling, the parking assistance apparatus including:

- a processor that generates a second parking route based on the first parking route and position information of an obstacle obtained by the teacher traveling, wherein the second parking route does not overlap with the obstacle,
- in which
- the processor parks a vehicle in a parking space by using the second parking route, and
- the second parking route is a parking route for the second parking.

A parking assistance method according to the present disclosure is a parking assistance method of a parking assistance apparatus that performs parking assistance for second parking based on a first parking route obtained by teacher traveling, the method including:

- generating a second parking route based on the first parking route and position information of an obstacle obtained by the teacher traveling, wherein the second parking route does not overlap with the obstacle; and
- parking a vehicle in a parking space by using the second parking route,
- in which the second parking route is a parking route for the second parking.

Advantageous Effects of Invention

According to the present disclosure, it is possible to perform automatic parking smoothly without stopping during the parking.

DESCRIPTION OF EMBODIMENTS

Embodiment

Figure 1:
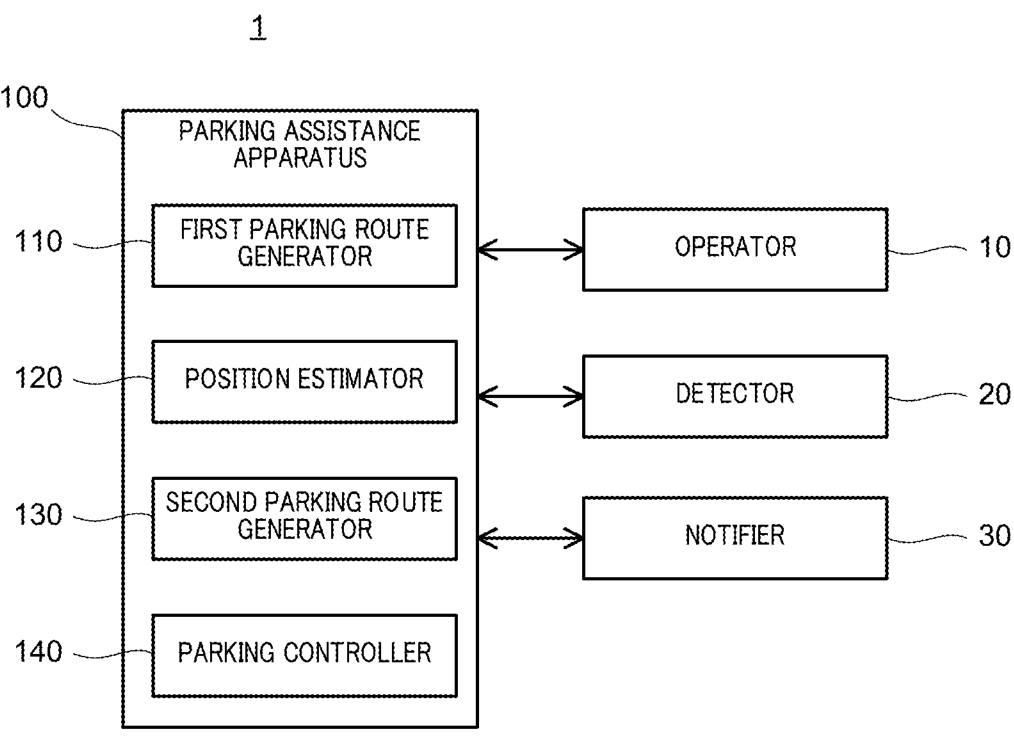
FIG. 1 is a block diagram illustrating an exemplary configuration of a vehicle to which a parking assistance apparatus according to an Embodiment 1 of the present disclosure is applied.

Hereinafter, an Embodiment 1 of the present disclosure will be described in detail based on the drawings. FIG. 1 is a block diagram illustrating an exemplary configuration of vehicle 1 to which parking assistance apparatus 100 according to Embodiment 1 of the present disclosure is applied.

As illustrated in FIG. 1, vehicle 1 has automatic parking assistance (so-called home zone parking assistance) function for automatically parking vehicle 1 in a predetermined parking space. Vehicle 1 includes operator 10, detector 20, notifier 30, and parking assistance apparatus 100.

Operator 10 includes a steering wheel and the like for a driver to perform driving operation of vehicle 1. Further, when the automatic parking control is performed by parking assistance apparatus 100, operator 10 may be controlled to act corresponding to, for example, the traveling on the second parking route described below.

Detector 20 is a vehicle-mounted sensor, for example, a radar or a camera, and detects an object in the surroundings of vehicle 1. Detector 20 may acquire the position information of an obstacle in the periphery of the traveling route of vehicle 1, for example, during traveling (teacher traveling) by the driving operation of the driver. Further, detector 20 may acquire, for example, before the start of the automatic parking control, the position information of an obstacle in a route (for example, a second parking route to be described below) on which vehicle 1 is to automatically travel, or may acquire the position information of an obstacle in a route on which vehicle 1 is automatically traveling during the automatic parking control.

Notifier 30 is, for example, a display or the like of a car navigation apparatus, a sound outputter or the like, and may notify the driver of the navigation information as well as, for example, information on the parking assistance from parking assistance apparatus 100. The parking assistance information includes, for example, information indicating that automatic parking control is stopped when detector 20 detected an object that may become an obstacle during automatic traveling in the automatic parking control.

Parking assistance apparatus 100 also includes a central processing unit (CPU), a read only memory (ROM), a random access memory (RAM), and an input/output circuit (not illustrated). Parking assistance apparatus 100 is capable of performing automatic parking control to park the vehicle automatically into a predetermined parking space and performs parking assistance for the second parking based on the first parking route obtained through teacher traveling. Specifically, parking assistance apparatus 100 stores a teacher route (first parking route) as teacher traveling data when a vehicle is parked in a predetermined parking space by the driving operation of a driver. When vehicle 1 parks in the predetermined parking space next time, vehicle 1 performs control of automatic parking (automatic parking control) based on the teacher traveling data. The second parking described above is traveling for parking into a predetermined parking space by vehicle 1, and is traveling for parking according to the automatic parking control.

In the present embodiment, by the automatic parking control, vehicle 1 can be automatically parked in a predetermined parking space using a second parking route generated according to the position information of an obstacle in periphery of the first parking route. Parking assistance apparatus 100 includes first parking route generator 110, position estimator 120, second parking route generator 130, and parking controller 140.

Figure 2:
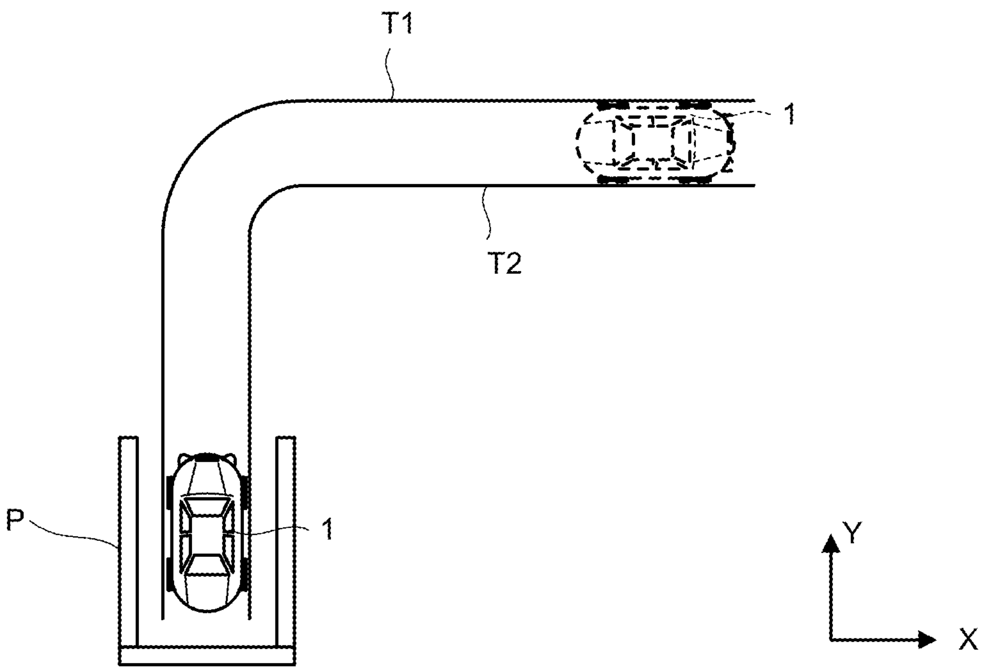
FIG. 2 is a diagram for describing a first parking route.

First parking route generator 110 generates a first parking route, a teacher route based on manual driving by the driver of vehicle 1. The first parking route is, for example, as illustrated in FIG. 2, a route on which vehicle 1 travels when vehicle 1 is parked in a predetermined parking space P through manual driving by the driver of vehicle 1, and is, for example, a route surrounded by solid line T1 and solid line T2 in FIG. 2.

In the following description, an orthogonal coordinate system (X, Y) is used. The drawings described below also illustrate the common orthogonal coordinate system (X, Y). For example, the X-axis represents the left-right direction in the drawing, and the Y-axis represents the up-down direction in the drawing.

First parking route generator 110 generates information on the route on which vehicle 1 travels during the manual driving by the driver of vehicle 1 (during operation of operator 10). Specifically, first parking route generator 110 acquires position information on an obstacle based on information about obstacles, such as a wall, in the surroundings of vehicle 1 detected by detector 20.

The position information of the obstacle may be used with the position information estimated by position estimator 120 described below, or may be used with the position information estimated by another estimator.

Then, for example, first parking route generator 110 calculates a route on which vehicle 1 has traveled from a predetermined start position to a predetermined parking space P, based on the positional relationship between vehicle 1 and the obstacle. First parking route generator 110 generates the route as a first parking route (teacher route) and stores the first parking route in a storage (not illustrated).

In the description below, it is assumed that the automatic parking control is performed with the position of vehicle 1 indicated with a broken line in FIG. 2 as the start position. Further, the position of parking space P is in a diagonal direction to the −X-axis side and −Y-axis side as viewed from the start position. Therefore, for example, a route as follows may be employed as the first parking route: a route on which that vehicle 1 starts from the start position, advances to the −X-axis side, then turns to the −Y-axis side, and continues straight toward the −Y-axis side to enter parking space P.

Position estimator 120 estimates the position information of an obstacle, such as an object located within the first parking route, and the position information of an obstacle located in periphery of the first parking route, which are acquired by detector 20 during the manual driving of vehicle 1 by the driver.

Figure 3:
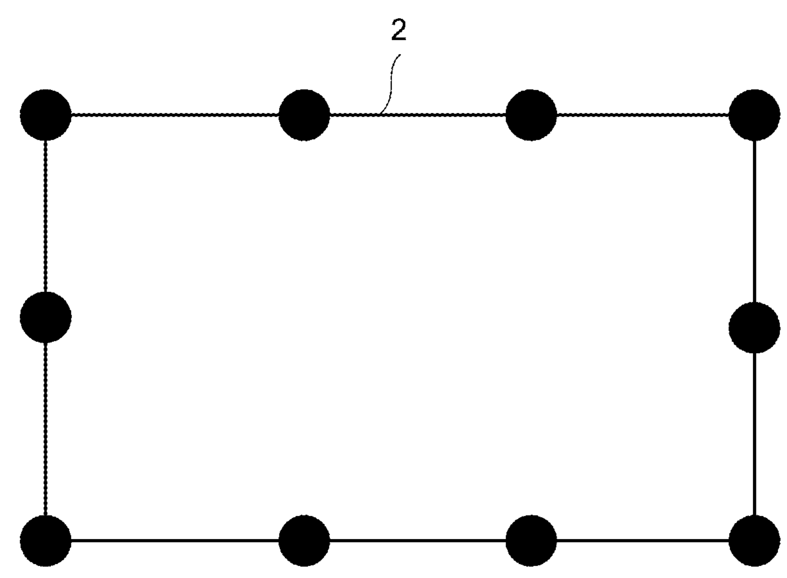
FIG. 3 is a diagram for describing the feature points of an object appearing in an image.

For example, when detector 20 is an imaging apparatus such as a camera, position estimator 120 extracts feature points of an object located in periphery of the first parking route from an image acquired during manual driving by the driver. The feature point is, for example, a point indicating a corner portion, an edge portion, or the like of object 2 (as indicated by a black dot in FIG. 3) which appears in an image captured by the imaging apparatus.

The method for extracting the feature points may be, for example, a known method such as the SIFT method, the Harris method, the FAST method, or a pre-trained convolutional neural network (CNN).

In addition, in a case where detector 20 is composed of an imaging apparatus and a radar, the feature points of an object located in the surroundings of vehicle 1 may be extracted based on the image acquired with the imaging apparatus and information such as the distance to the object detected with the radar.

Position estimator 120 estimates the position information of an object (obstacle) based on the above-described feature points. The position information estimation method may be any known method such as a method of comparing feature points detected by, for example, an imaging apparatus (detector 20) with feature points stored in map data, or a method using distance information on an object detected by a radar. The position information of the obstacle estimated by position estimator 120 is stored in the storage together with the first parking route.

Further, position estimator 120 may determine whether an object is an obstacle based on the feature points of the object acquired from detector 20. For example, when an object has a height such that the object would collide with vehicle 1 or obstruct the travel of vehicle 1, position estimator 120 may determine that the object is an obstacle. Further, position estimator 120 may determine that an object is not an obstacle when the object has a height such that vehicle 1 can travel over it.

Second parking route generator 130 generates the second parking route at the timing when the teacher traveling of vehicle 1 ends. Specifically, second parking route generator 130 generates a route that does not overlap with the obstacle as the second parking route, based on the first parking route and the position information of the obstacle.

For example, in a portion where the distance from the obstacle (based on the position information estimated by position estimator 120) to the first parking route is less than a predetermined distance, second parking route generator 130 may calculate the traveling route of vehicle 1 to be away from the obstacle by a distance equal to or larger than the predetermined distance, thereby generating the second parking route.

The predetermined distance may be, for example, a distance that can be set as appropriate, such as a distance at which there is no risk of contact between vehicle 1 and the obstacle.

Further, for portions other than the portion where the distance from the obstacle to the first parking route is less than the predetermined distance, the same route as the first parking route may be applied as the second parking route, or a new traveling route that does not overlap with the obstacle may be generated as the second parking route.

Figure 4A:
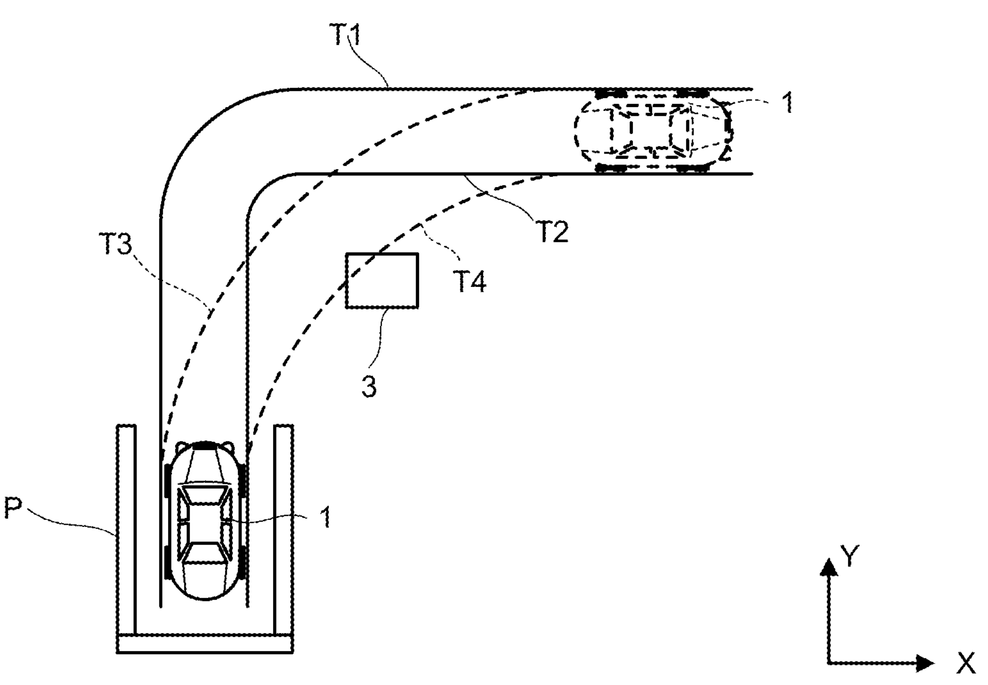
FIG. 4A illustrates an example of a first parking route.

For example, as illustrated in FIG. 4A, it is assumed that vehicle 1, during teacher traveling, takes a relatively roundabout route (having a larger turn) while avoiding obstacle 3, and that the route is generated as the first parking route (the portion surrounded by broken line T1 and broken line T2).

The first parking route illustrated in FIG. 4A is a route including a first portion and a second portion. Here, the first portion extends from the start position to the −X-axis side and the second portion changes its direction to the −Y-axis side from the end of the first portion on the −X-axis side, and extends to the −Y-axis side. In FIG. 4A, for example, obstacle 3 is located on the −Y-axis side from the first portion of the first parking route.

Here, for example, it is assumed that the first parking route is modified to a route to parking space P at the shortest distance from the starting position (a portion surrounded by broken line T3 and broken line T4), from the viewpoints of the control efficiency in the automatic parking of vehicle 1 and shortening the movement distance of vehicle 1. In this case, there is a possibility that the vehicle would collide with obstacle 3 even when the vehicle would not collide with obstacle 3 in the original first parking route. Therefore, for optimizing the first parking route, it is necessary to consider the positional relationship between the optimized route and the originally existing obstacle 3.

Figure 4B:
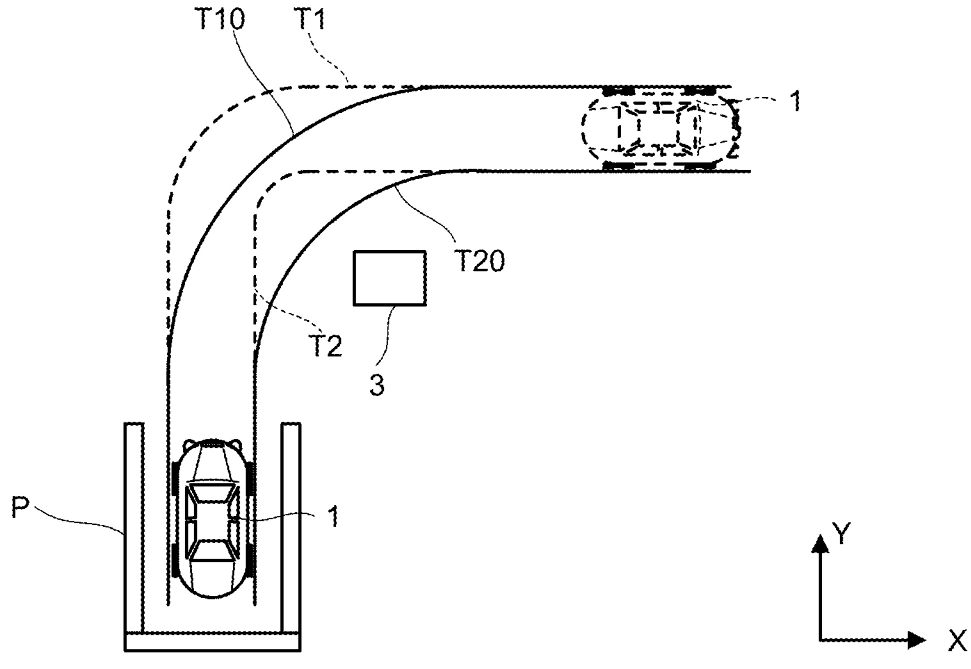
FIG. 4B illustrates an example of a second parking route generated based on the first parking route in FIG. 4A.

In the present embodiment, the position information of obstacle 3 described above is estimated by position estimator 120 during the teacher traveling, and based on this position information and the generated first parking route, second parking route generator 130 generates a second parking route so that the route and obstacle 3 do not overlap with each other. For example, as illustrated in FIG. 4B, second parking route generator 130 may generate a route that has a smaller turn than the first parking route and is away from obstacle 3 as a second parking route. The second parking route is a route surrounded by solid line T10 and solid line T20.

Figure 5A:
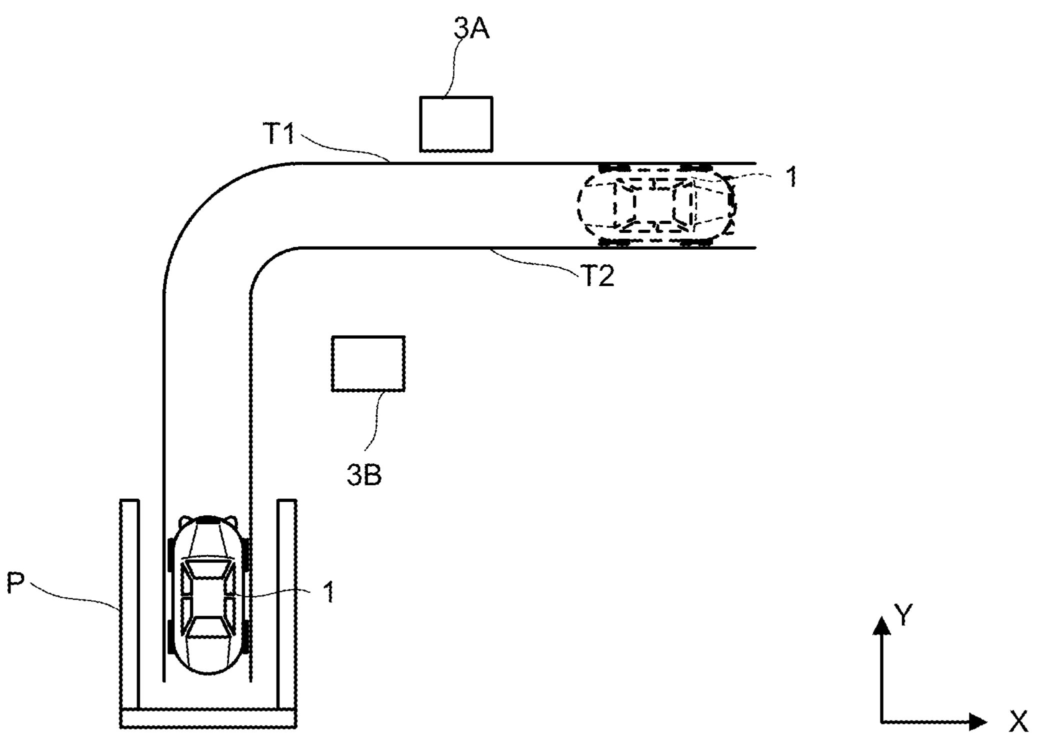
FIG. 5A illustrates an example of the first parking route.

Further, as illustrated in FIG. 5A, when vehicle 1 performs teacher traveling, it is assumed that vehicle 1 passes through a route that is extremely close to obstacle 3A (although vehicle 1 does not come into contact with any obstacles in periphery of the parking space), and that this route is generated as the first parking route. The first parking route illustrated in FIG. 5A is the same as the route illustrated in FIG. 4A. Obstacle 3A is an object located on the +Y-axis side from the first portion (portion extending to the −X-axis side) of the first parking route (route surrounded by solid line T1 and solid line T2).

Further, FIG. 5A illustrates obstacle 3B that is located on the side opposite to obstacle 3A across the first parking route (the first portion described above), and obstacle 3B is assumed to be sufficiently away from the first parking route.

Figure 5B:
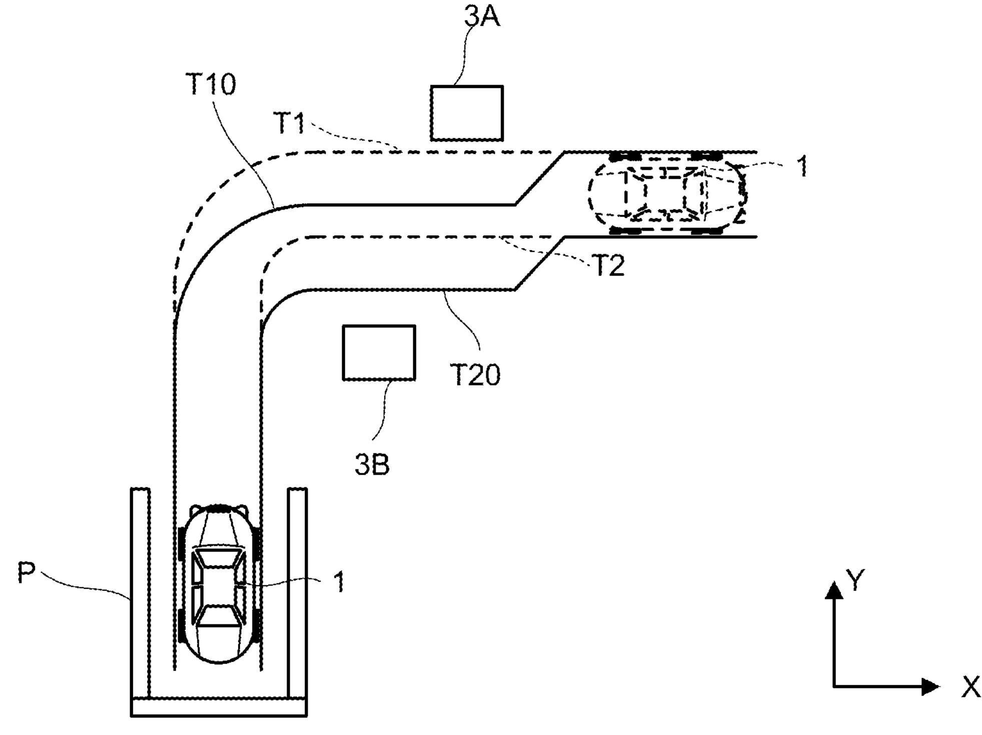
FIG. 5B illustrates an example of the second parking route generated based on the first parking route in FIG. 5A.

In this case, based on the position information of obstacle 3A and the generated first parking route, second parking route generator 130 may generate a route, for example, as the second parking route (the route surrounded by solid line T10 and solid line T20), with the distance between vehicle 1 and obstacle 3A larger than that in the first parking route, as illustrated in FIG. 5B.

In this case, as the distance from obstacle 3A increases, the vehicle comes close to obstacle 3B located on the side opposite to obstacle 3A across the route from obstacle 3A. The second parking route may be generated so that the distance between the vehicle and obstacle 3B is, for example, equal to or larger than a predetermined distance in such a case.

As described above, second parking route generator 130 may generate the second parking route as a route different from the first parking route according to a distance between the obstacle and vehicle 1 in the first parking route.

Thus, it is possible to use the optimized first parking route as the second parking route.

Figure 6A:
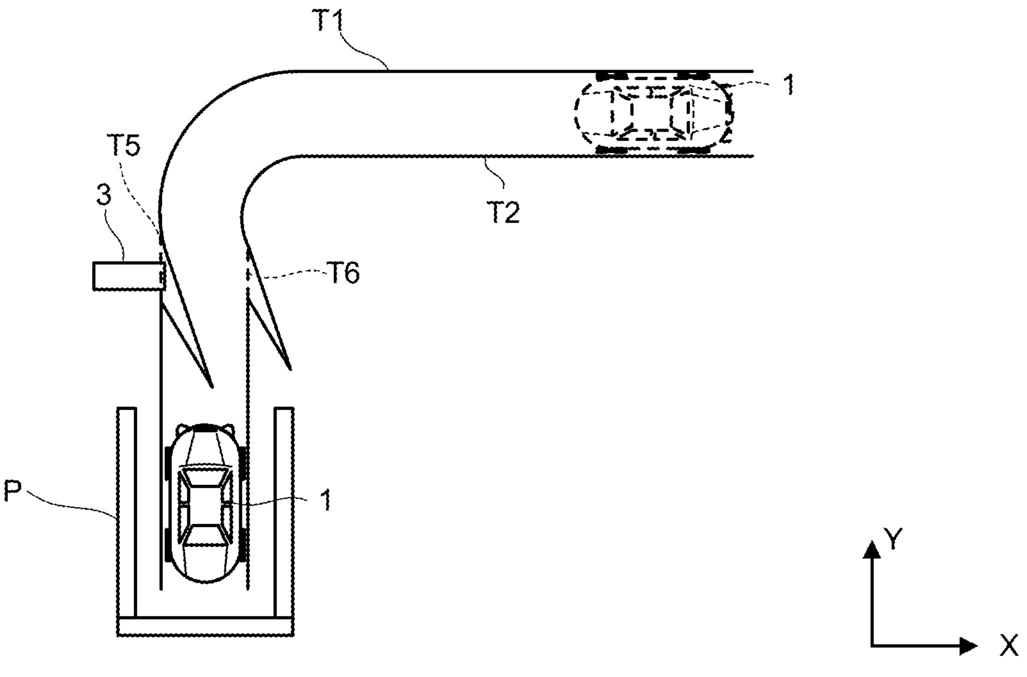
FIG. 6A illustrates an example of the first parking route.

Further, as illustrated in FIG. 6A, it is assumed that a route, in which the position and direction of vehicle 1 are changed so as to avoid obstacle 3 in periphery of the parking space during teacher traveling of vehicle 1, is generated as the first parking route.

In FIG. 6A, for example, the route in which vehicle 1, after advancing from the start position to the −X-axis side and then changing direction to the −Y-axis side, advances in a direction inclined with respect to the Y-axis by turning too much to avoid obstacle 3 is illustrated as the first parking route. Further, the first parking route is a route in which vehicle 1 advances in the inclined direction, then advances to the +Y-axis side once, and advances to the parking space P after vehicle 1 adjusts its posture. Obstacle 3 is located in a position partially overlapping with a route (a portion surrounded by broken line T5 and broken line T6) when vehicle 1 changes direction to the −Y-axis side and advances in a straight line to the −Y-axis side.

Figure 6B:
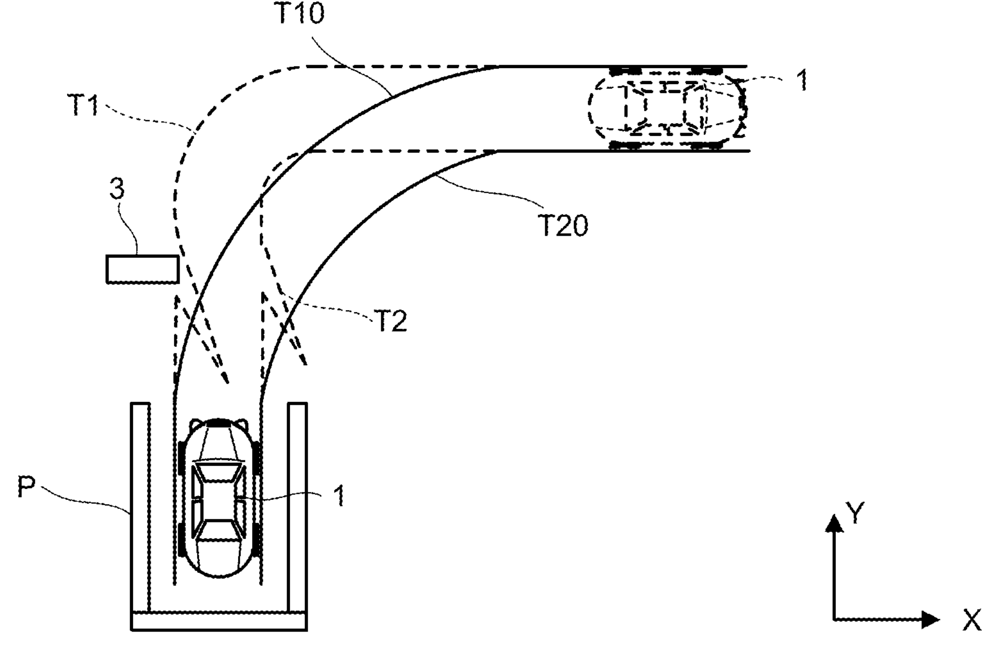
FIG. 6B illustrates an example of the second parking route generated based on the first parking route in FIG. 6A.

In this case, as illustrated in FIG. 6B, based on the position information of an obstacle in periphery of the first parking route and the generated first parking route, second parking route generator 130 may generate a route that does not overlap with the obstacle described above and draws a natural trajectory as the second parking route.

FIG. 6B illustrates a route that enters parking space P from the start position along a gentler trajectory than the first parking route, as the second parking route.

As described above, second parking route generator 130 may generate, as the second parking route, a route that decreases the operation frequency of vehicle 1 as compared to the first parking route. An example of decreasing the operation frequency of vehicle 1 is such that only the operation of driving is performed and the operation of changing the gear is not performed in the second parking route, while the operations of driving, reversing, and driving are performed and the operation of changing the gear is performed in the first parking route as in the example of FIG. 6A. Another example of decreasing the operation frequency of vehicle 1 is such that when the vehicle enters the parking space by drawing a predetermined arc, the vehicle enters the parking space by drawing an arc that is smaller and smoother in the second parking route than that in the first parking route.

Thus, a route obtained by optimizing the first parking route may be used as the second parking route. Further, an example of optimizing the first parking route is such that causing the movement of vehicle 1 to become smoother, for example, changing the route from that in FIG. 6A to that in FIG. 6B, and decreasing the traveling time in the automatic parking of vehicle 1 as compared to the first parking route.

Parking controller 140 performs automatic parking control to park vehicle 1 in the parking space using the second parking route. For example, parking controller 140 controls operator 10 to perform control of causing vehicle 1 to park in the parking space through the second parking route. Other controls related to traveling, such as the control of the accelerator pedal, the brake pedal, and the shift lever, may be performed entirely by parking controller 140 or partially by the driver manually.

Figure 7:
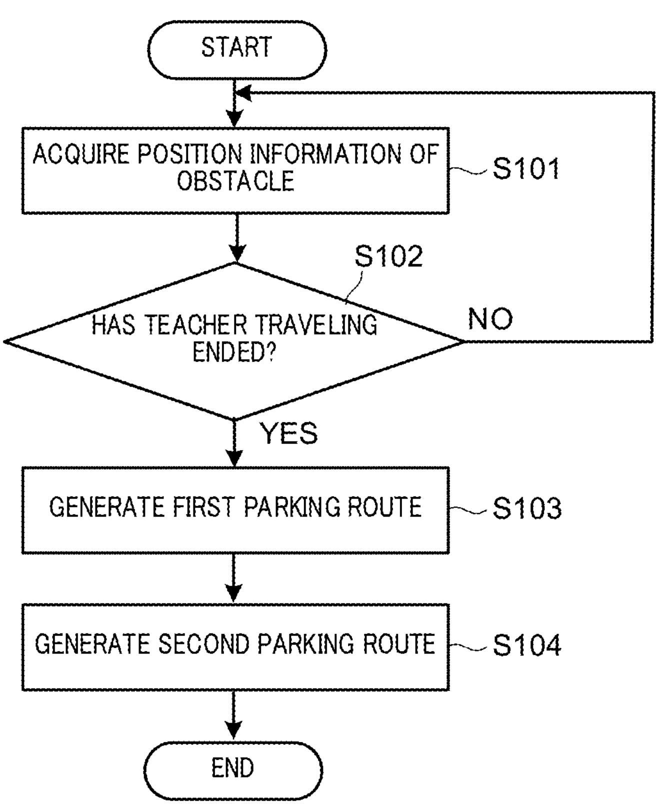
FIG. 7 is a flowchart illustrating an exemplary operation of generation control of the second parking route in the parking assistance apparatus.

Next, an exemplary operation of generation control of the second parking route in parking assistance apparatus 100 configured as described above will be described. FIG. 7 is a flowchart illustrating the exemplary operation of the generation control of the second parking route in parking assistance apparatus 100. The processing in FIG. 7 is executed as appropriate, for example, when parking assistance apparatus 100 receives an instruction to start a teacher traveling at the parking start position.

As illustrated in FIG. 7, parking controller 140 acquires the position information of an obstacle (step S101). Specifically, parking controller 140 continuously acquires obstacle position information during travel.

Next, parking controller 140 determines whether the teacher traveling has ended (step S102). The end of the teacher traveling can be determined, for example, when parking assistance apparatus 100 acquires a command indicating the end of the teacher traveling, such as when the driver presses a button for ending the teacher traveling. When it is determined that the teacher traveling is not ended (step S102, NO), the processing is returned to step S101.

When the teacher traveling ends (step S102, YES), on the other hand, parking controller 140 generates a first parking route (step S103). Specifically, parking controller 140 generates the route (through which vehicle 1 passes through) stored during the teacher traveling as the first parking route.

Then, parking controller 140 generates a second parking route (step S104). Specifically, parking controller 140 generates the second parking route based on the first parking route generated in step S103 and the position information of the obstacle acquired in step S101. Thereafter, the control ends.

According to the present embodiment configured as described above, a second parking route that does not overlap with an obstacle are generated based on a first parking route (which is based on the teacher traveling) and the position information of the obstacle. As a result, automatic parking control can be performed along a route that reliably avoids obstacles, thereby allowing smooth automatic parking without stopping during the parking.

Further, since the second parking route is generated as a route that decreases the operation frequency of vehicle 1 as compared to the first parking route, automatic parking can be performed more smoothly.

Further, the second parking route is generated at the timing when the teacher traveling of vehicle 1 ends, and thus, the automatic parking control can be started with the second parking path having been prepared.

Next, Embodiment 2 of the present disclosure will be described. Parking assistance apparatus 100 in Embodiment 2 has the same configuration as that in Embodiment 1 described above, and generates the second parking route in the same method as that in Embodiment 1 described above.

When an obstacle is detected during the automatic parking control by parking controller 140, second parking route generator 130 may modify the second parking route.

For example, there are cases where an obstacle that was not present during the teacher traveling is present in the parking route when the automatic parking control is performed. Examples of the obstacle in such a case include a temporarily placed object, a person, an animal, a moving object that intrudes into the route, a plant grown in the route, and a permanently placed object that is constructed in the route.

In this case, second parking route generator 130 continuously acquires the position information on obstacles estimated by position estimator 120 during the automatic parking control and generates a parking route that avoids an obstacle when the obstacle is located within the second parking route. Specifically, second parking route generator 130 generates a third parking route by modifying the second parking route based on the position information of a first obstacle acquired during the teacher traveling and the position information of a second obstacle acquired during the automatic parking control.

Figure 8A:
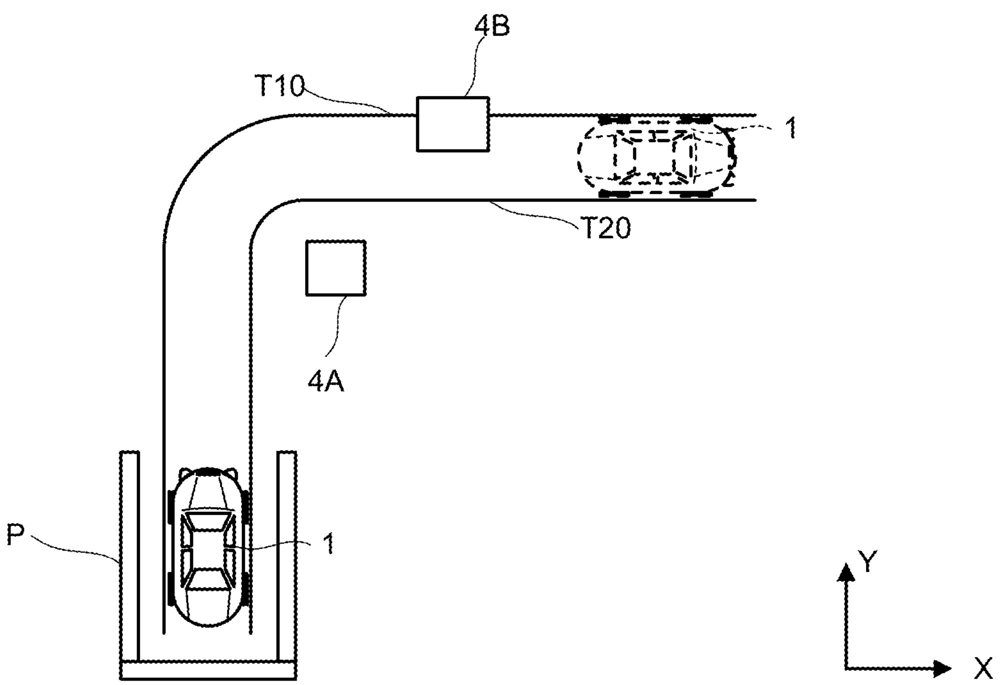
FIG. 8A illustrates an example of the second parking route with an obstacle placed after the generation thereof.

For example, as illustrated in FIG. 8A, it is assumed that the second parking route (the route surrounded by T10 and T20) has been generated, in which the vehicle advances to the −X-axis side from the start position, then changes direction, advances to the −Y-axis side, and enters parking space P.

The second parking route is generated based on the position information of first obstacle 4A located on the −Y-axis side from a portion (extending along the X-axis) of the second parking route. However, it is assumed that a predetermined time has elapsed after the second parking route is generated and second obstacle 4B is placed within the second parking route. Second obstacle 4B is placed in a position corresponding to the end on the portion (extending along the X-axis) of the second parking route on the +Y-axis side.

Figure 8B:
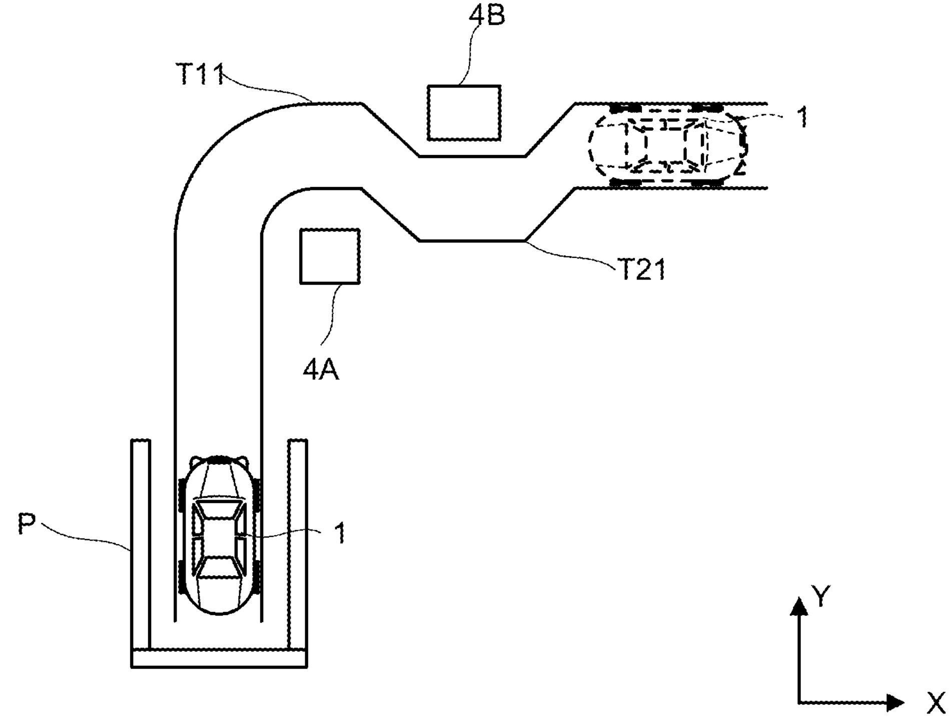
FIG. 8B illustrates an example of a third parking route generated based on the second parking route in FIG. 8A.

As illustrated in FIG. 8B, second parking route generator 130 generates a third parking route by modifying the second parking route based on the position information of second obstacle 4B detected during the automatic parking control. The third parking route is a route surrounded by solid line T11 and solid line T21.

The third parking route illustrated in FIG. 8B is a route that avoids second obstacle 4B while simultaneously avoiding first obstacle 4A (which is in periphery of second obstacle 4B) and thus bypasses second obstacle 4B. As described above, second parking route generator 130 may modify the second parking route to a route that bypasses an obstacle detected during the automatic parking control.

In this manner, the second parking route can be modified according to the situation, thereby preventing automatic parking from stopping during the procedure.

Further, when it is not possible to avoid the second obstacle acquired during the automatic parking control, second parking route generator 130 may output, for example, a command to notify the driver that the second parking route cannot be modified to notifier 30. In this case, notifier 30 may notify the driver that the vehicle cannot perform the automatic parking control or that there is an obstacle in the second parking route.

Further, second parking route generator 130 may output a command to notifier 30 to inquire whether the obstacle at the second parking route can be removed by the driver. In this case, notifier 30 may perform a notification inquiring the driver whether the obstacle at the second parking route can be removed.

For example, when the obstacle in the second parking route can be removed and the driver removes the obstacle, parking controller 140 may restart the automatic parking control as soon as a command to restart the automatic parking control (for example, the driver presses a predetermined button) is acquired. Further, parking controller 140 may be configured to restart the automatic parking control as soon as an obstacle is no longer detected by detector 20.

Further, when the third parking route is generated after the second parking route is generated, parking controller 140 may update the second parking route to the third parking route.

For example, when second obstacle 4B illustrated in FIG. 8A is an obstacle that is permanently disposed after the second parking route is generated, second obstacle 4B will always be present when the automatic parking control is performed toward parking space P. Therefore, by updating the second parking route at the time the third parking route is first generated, there is no need to generate the third parking route each time automatic parking control is performed. As a result, it is possible to omit the route generation process and reduce the processing load.

Further, when the third parking route is generated after the second parking route is generated, parking controller 140 may be configured to allow the driver to select either the second parking route or the third parking route when performing automatic parking control.

For example, in a case where second obstacle 4B illustrated in FIG. 8A is an obstacle that is temporarily disposed, second obstacle 4B will not be present after a certain period has elapsed. Therefore, in a case where second obstacle 4B is present, the route generation process can be omitted and the processing load can be reduced by causing the driver to select the third parking route and to select the second parking route after second obstacle 4B is no longer present.

In the above embodiments, first parking route generator 110 generates the first parking route (teacher route), but the present disclosure is not limited thereto. For example, the first parking route may be configured such that the storage stores a route that vehicle 1 traveled when vehicle 1 was parked in a predetermined parking space P by the manual driving of the driver of vehicle 1.

In the above embodiments, the second parking route was generated using the acquired position information of the obstacle during the teacher traveling, but the present disclosure is not limited thereto. For example, the second parking route may be generated using the position information of an obstacle acquired during the teacher traveling and the position information of an object based on map data or the like.

In the above embodiments, the second parking route was generated at the timing when the teacher traveling of the vehicle ends, but the present disclosure is not limited thereto, and the second parking route may be generated before the automatic parking control is performed. Further, the second parking route may be generated each time the automatic parking control is performed.

Further, in the above embodiment, the traveling route based on the manual driving of the driver has been generated as the first parking route (teacher route), but the present disclosure is not limited thereto, and a traveling route based on the automatic parking assistance function of the vehicle may be generated as the first parking route.

Further, in the above embodiments, the first parking route generator is included, but the present disclosure is not limited thereto and the first parking route generator does not have to be included. In this case, for example, it is possible to acquire a first parking route generated by an external apparatus.

Further, in the above embodiments, the parking assistance apparatus is provided in the vehicle, but the present disclosure is not limited thereto, and the parking assistance apparatus may be provided in an external apparatus of the vehicle. In this case, the external apparatus parks the vehicle in the parking space through remote operation. Further, some of the processes of the parking assistance apparatus may be performed, for example, on the cloud. Specifically, the configuration may be as follows: on the cloud, the teacher route and the feature points in the surroundings of the teacher route are processed to generate a second parking route, which is then transmitted to the vehicle; and the vehicle acquires the information of the second parking route and performs parking assistance.

Further, the plurality of parking assistance apparatuses may be configured to transmit and receive data of the teacher route and the reverse route to and from each other. For example, in a case where an apparatus including a parking assistance apparatus with the recorded data is replaced, or in a case where a vehicle with the recorded data is replaced with a vehicle having the same shape, the data handover can be facilitated by transferring the data to another apparatus.

In addition, in the above embodiments, the second parking route generator and the parking controller are incorporated in the parking assistance apparatus, but the present disclosure is not limited thereto, and may have a configuration in which the second parking route generator and the parking controller are provided in separate apparatuses.

The embodiments above are no more than specific examples in carrying out the present disclosure, and the technical scope of the present disclosure is not to be construed in a limitative sense due to the specific examples. That is, the present disclosure can be implemented in various forms without departing from its spirit or key features.

The disclosure of Japanese Patent Application No. 2022-049962, filed on Mar. 25, 2022, including the specification, drawings and abstract, is incorporated herein by reference in its entirety.

INDUSTRIAL APPLICABILITY

The parking assistance apparatus of the present disclosure is useful as a parking assistance apparatus and for a parking assistance method both capable of performing automatic parking smoothly without stopping during the parking.

The invention claimed is:

1. A parking assistance apparatus that automatically parks a vehicle based on a teacher route obtained by manual driving by a driver, the parking assistance apparatus comprising:

- a storage that stores the teacher route traveled when the vehicle is parked in a parking space;
- a detector that detects a plurality of obstacles; and
- a processor that:
  - generates a parking route based on the teacher route and the plurality of obstacles, wherein the parking route is a route to be traveled when the vehicle is to be automatically parked in the parking space; and
  - performs vehicle control to park the vehicle in the parking space, wherein
  - the plurality of obstacles includes a first obstacle and a second obstacle,
  - the second obstacle is located on an opposite side of the parking route from the first obstacle,
  - the parking route is a route along which the vehicle moves away from the first obstacle, and
  - the parking route is a route along which a distance between the second obstacle and the vehicle is shorter than a distance between the second obstacle and the vehicle in the teacher route.

2. The parking assistance apparatus according to claim 1, wherein

- the processor generates the parking route at timing when the teacher traveling of the vehicle ends.

3. The parking assistance apparatus according to claim 1, wherein the processor modifies the parking route when at least one of the first obstacle or the second obstacle is detected during automatic parking control of the vehicle.

4. The parking assistance apparatus according to claim 3, wherein the processor modifies the parking route to a route that bypasses at least one of the first obstacle or the second obstacle detected during the automatic parking control.

5. The parking assistance apparatus according to claim 3, wherein the processor outputs a command to inquire whether at least one of the first obstacle or the second obstacle at the parking route is removable.

6. The parking assistance apparatus according to claim 1, wherein the processor generates, as the parking route, a route different from the teacher route according to distances between the plurality of obstacles and the vehicle.

7. The parking assistance apparatus according to claim 1, wherein the processor generates, as the parking route, a route that decreases an operation frequency of the vehicle compared to the teacher route.

8. The parking assistance apparatus according to claim 2, wherein the processor modifies the parking route when at least one of the first obstacle or the second obstacle is detected during automatic parking control of the vehicle.

9. The parking assistance apparatus according to claim 8, wherein the processor modifies the parking route to a route that bypasses at least one of the first obstacle or the second obstacle detected during the automatic parking control.

10. The parking assistance apparatus according to claim 8, wherein the processor outputs a command to inquire whether at least one of the first obstacle or the second obstacle at the parking route is removable.

11. The parking assistance apparatus according to claim 2, wherein the processor generates, as the parking route, a route that decreases an operation frequency of the vehicle compared to the teacher route.

12. The parking assistance apparatus according to claim 3, wherein the processor generates, as the parking route, a route that decreases an operation frequency of the vehicle compared to the teacher route.

13. A parking assistance method of a parking assistance apparatus that automatically parks a vehicle based on a teacher route obtained by manual driving by a driver, the method comprising:

storing, in a storage, the teacher route traveled when the vehicle is parked in a parking space;

detecting, by a detector, a plurality of obstacles;

generating a parking route based on the teacher route and plurality of obstacles, wherein the parking route is a route to be traveled when the vehicle is to be automatically parked in the parking space; and performing vehicle control to park the vehicle in the parking space, wherein the plurality of obstacles includes a first obstacle and a second obstacle, the second obstacle is located on an opposite side of the parking route from the first obstacle, the parking route is a route along which the vehicle moves away from the first obstacle, and the parking route is a route along which a distance between the second obstacle and the vehicle is shorter than a distance between the second obstacle and the vehicle in the teacher route.

14. The parking assistance method according to claim 13, wherein the generating includes generating the parking route at timing when the teacher traveling of the vehicle ends.

15. The parking assistance method according to claim 13, wherein the generating includes modifying the parking route when the second obstacle is detected during automatic parking control of the vehicle.

16. The parking assistance method according to claim 15, wherein the generating includes modifying the parking route to a route that bypasses at least one of the first obstacle or the second obstacle detected during the automatic parking control.

17. The parking assistance method according to claim 15, wherein the generating includes outputting a command to inquire whether at least one of the first obstacle or the second obstacle at the parking route is removable.

18. The parking assistance method according to claim 13, wherein the generating includes generating, as the parking route, a route different from the teacher route according to distances between the plurality of obstacles and the vehicle.

19. The parking assistance apparatus according to claim 1, wherein the distance between the second obstacle and the vehicle in the parking route is equal to or greater than a predetermined distance.

20. The parking assistance apparatus according to claim 1, wherein when the detector detects the plurality of obstacles on the parking route during the vehicle control by the processor, the processor modifies the parking route to a route that bypasses the plurality of obstacles.

* * * * *